Sept. 19, 1939.   M. K. VON ZIMMERMANN   2,173,135
HELICAL PERIPHERY CAM
Filed Feb. 14, 1938
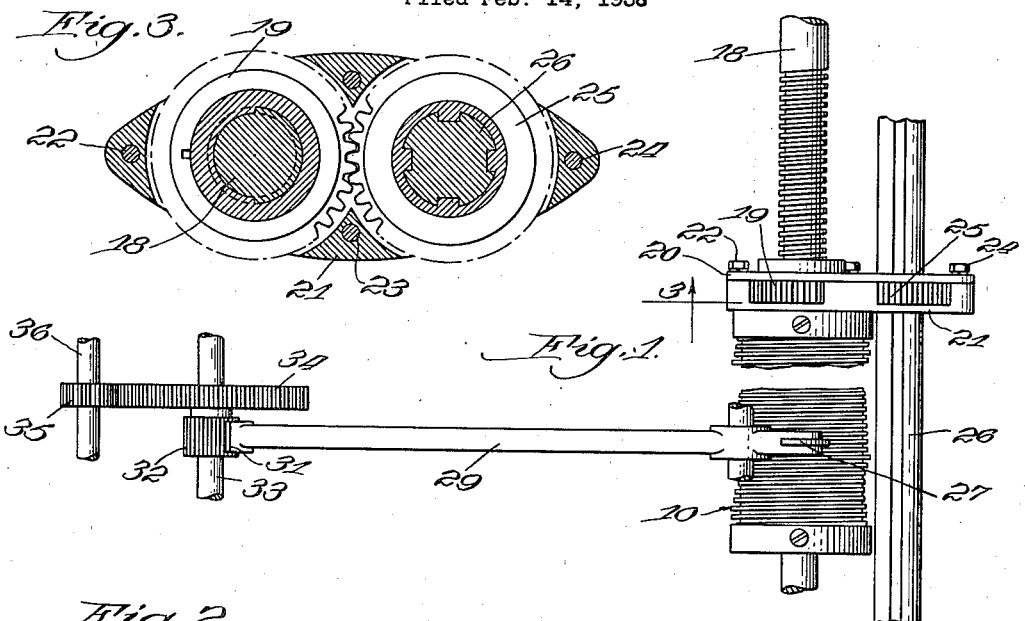
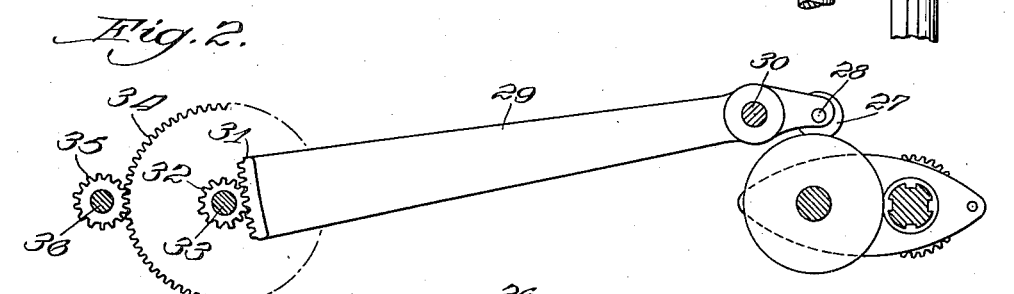
Inventor:
Max Kurt von Zimmermann
By Chritton, Wiles, Davis, Hirschl and Dawson
Attys.

Patented Sept. 19, 1939

2,173,135

UNITED STATES PATENT OFFICE 2,173,135

HELICAL PERIPHERY CAM

Max Kurt von Zimmermann, Muskegon, Mich.

Application February 14, 1938, Serial No. 190,502

10 Claims. (Cl. 74—55)

This invention relates to a helical periphery cam, and more particularly to a cam mechanism wherein the cam surface is helically arranged.

One feature of this invention is that it provides a very long cam surface in a compact device; another feature of this invention is that it is adapted to provide any desired configuration of the cam surface; yet another feature of this invention is that it is adapted to actuate a cam follower in a large number of predetermined movements before it is necessary to repeat the sequence; other features and advantages of this invention will be apparent from the following specification and the drawing, in which:

Figure 1 is a top plan view of one embodiment of my invention; Figure 2 is a side elevation of the same device, partly in section; Figure 3 is a sectional view along the line 3 of Figure 1; Figure 4 is a fragmentary sectional view along the axis of the cylindrical cam member; and Figure 5 is a view along the line 5 of Figure 4, showing one convolution of the cam surface in detail.

It is frequently desirable to make some portion of a machine perform a number of different operations or movements before the sequence is repeated. In order to achieve these movements by a cam action, it is necessary that the cam have a long effective cam surface. If the conventional disc type cam is used a long surface, of course, means an undesirably large diameter.

The present invention provides an improved cam wherein a very long cam surface is provided in compact form. This is accomplished by having a relatively narrow cam surface, and winding it or helically arranging it on the cam member, which may be of cylindrical, conical, or other form having any desired cross section; and by providing means for maintaining a cam follower in proper relation to the cam surface during relative movement between the two parts.

In the particular embodiment of my invention illustrated herewith a cylindrical cam member is provided, having a tubular body 10 with end members or plates 11 and 12, these end plates being fastened to the tubular body in any convenient manner, as by the screws 13 and 14. The end plate 11 is provided with an internally threaded portion 15, and the end plate 12 with an internal bearing surface 16 of a diameter equal to the lesser diameter of the threaded portion 15. These two openings are in alignment, and concentric with the tubular or body portion of the cylindrical member, so that they are coaxial therewith.

The tubular body 10 of the cylindrical cam member is externally threaded as a constant pitch screw, the threads 17 being of uniform minor diameter, but varying major diameter or radial height, so that the outer periphery thereof forms a cam surface. The pitch of the external and internal threaded portions are the same.

The cylindrical cam member 10 is adapted to be rotatably mounted on a threaded rod member 18, which may be fixedly mounted in any desired manner. The mounting of the cylindrical cam member on the rod member 18 is such that when the cam member is rotated, translatory movement thereof along the axis is effected.

In order to effect this rotation, the cylindrical cam member is here shown as provided at one end with gear mechanism. A gear 19 is splined to the end plate 11, and is immovable with respect thereto. A pair of gear plates 20 and 21 are mounted about the gear 19 on each side thereof, being held together in any convenient manner, as by the studs 22, 23 and 24. These gear plates extend to one side and embrace therewithin a second gear or pinion 25, which gear is thus held in position to engage the gear 19. This latter gear is slidably splined on a shaft or rod member 26, parallel to the rod member 18 and slightly to one side thereof, as may be clearly seen in Figure 1. The gear carriage formed by the two plates 20 and 21 is freely rotatable with respect to the two gears, and with respect to the body portion of the cylindrical cam member. The function of this carriage is to maintain the gears in proper engagement during translatory movement thereof.

As has been heretofore mentioned, the outer periphery of the exterior threads 17 form a narrow cam surface. This surface is of varying radial height, as may be seen clearly from Figures 4 and 5, and is adapted to provide the desired actuation of a cam follower. The cam follower is here shown as a roller 27 pivotally mounted at 28 on the short end of a motion-multiplying arm 29 fulcrumed at 30. The other end of the motion-multiplying lever or rocker arm 29 is provided with a segment gear arc 31 in engagement with a pinion 32. The pinion 32 is adapted to rotate the shaft 33 upon movement of the rocker arm 29, and further motion-multiplying means may be provided if desired, as by the gear 34 and pinion 35. The motion thus achieved in the shaft 36 may be used in any conventional manner to drive various mechanisms.

It is apparent that rotation of the rod or shaft 26, by any desired source of power, effects rotation of the cylindrical cam member 10 through the medium of the gears 25 and 19. This rotation of the cam member achieves two desired movements: the first is the relative movement between the cam surface 17 and the follower 27, so that the follower is actuated in a predetermined manner in movement substantially radial with respect to the cylindrical cam member; and the second is a translatory movement along the axis of the rod member 18 synchronized with the helical arrangement of the cam surface, so that the follower is always maintained in proper relation thereto during relative movement between the cam surface and follower. That is, the cam follower in effect moves along the helical cam surface from one end of the cam member to the other, performing the desired movements in accordance with the shape of the various portions of the cam surface. While Figure 5 shows several cam lobes in one circumvolution of the cam surface, it is to be understood that a cam lobe may, if desired, comprise any number of such circumvolutions. Thus, the entire helical cam surface may comprise a single lobe, or any desired number of such lobes of varying form or arrangement.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim:

1. Apparatus of the character described, including: a cam member having a cam surface helically arranged thereon; a follower member adapted to contact said surface; and means independent of said contact for moving one of said members to maintain them in correct relationship during relative movement between said follower and cam surface.

2. Apparatus of the character described, including: a cam member having a cam surface helically arranged thereon, said surface being narrow; a follower member adapted to contact said surface and derive predetermined movement therefrom during relative movement between said surface and follower; and means independent of said contact for moving one of said members to maintain correct relationship during such relative movement.

3. Apparatus of the character described, including: a cam member having a cam surface helically arranged thereon, said surface being narrow; a follower member adapted to contact said surface; means for rotating one of said members about the axis of the cam surface helix; and means independent of said contact for laterally moving one of said members during such rotation to maintain said follower member in correct relationship with said cam surface.

4. Apparatus of the character described, including: a cylindrical cam member having a raised narrow cam surface helically arranged thereon; a follower member adapted to contact said cam surface and derive predetermined movement from the variations in such surface during relative movement between said surface and follower; means for rotating one of said members about the axis of said cylindrical member; and means independent of said contact for moving one of said members in a direction parallel to said axis during such rotation to maintain said follower member in correct relationship with said cam surface.

5. Apparatus of the character described, including: a cylindrical cam member having a narrow cam surface helically arranged thereon in a uniform helix, the radial height of said cam surface varying; a follower member adapted to contact said cam surface and derive predetermined movement from the variations in such surface during relative movement between said surface and follower; means for rotating one of said members about the axis of said cylindrical member; and means independent of said contact for moving one of said members in a direction parallel to said axis and a distance equal to the spacing between adjacent turns of said helically arranged cam surface during each such rotation.

6. Apparatus of the character claimed in claim 5, wherein said cylindrical member is rotated about its axis.

7. Apparatus of the character claimed in claim 5, wherein said cylindrical member is both rotated about its axis and moved therealong.

8. Apparatus of the character described, including: a cylindrical cam member having a raised narrow cam surface helically arranged on the exterior thereof and being interiorly threaded, the thread and helically arranged cam surface having the same lead and the radial height of said cam surface varying; a rod member on which said cylinder is threaded; a follower member adapted to contact said cam surface and derive predetermined movement from the variations in such surface during relative movement between said surface and follower; and means for rotating said cylindrical member about its axis to effect said relative movement and simultaneous movement along said rod to maintain said follower and cam surface in correct relationship during such relative movement.

9. Apparatus of the character claimed in claim 8, including motion multiplying means actuated by said follower.

10. Apparatus of the character claimed in claim 8, including: a second rod member parallel to said first mentioned rod member; a gear on said cylindrical member; a gear in engagement with said first mentioned gear and slidably splined to said second mentioned rod member to be driven thereby; and means for maintaining said gears in engagement.

MAX KURT von ZIMMERMANN.